(12) United States Patent
Shoji et al.

(10) Patent No.: US 6,703,157 B1
(45) Date of Patent: Mar. 9, 2004

(54) CYLINDRICAL BATTERY AND METHOD FOR MANUFACTURING THE SAME

(75) Inventors: Yasuhiko Shoji, Higashiosaka (JP); Isao Kubo, Kadoma (JP); Kenji Yamamoto, Neyagawa (JP); Yuji Mototani, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/959,558

(22) PCT Filed: Mar. 29, 2000

(86) PCT No.: PCT/JP00/01980
§ 371 (c)(1),
(2), (4) Date: Oct. 30, 2001

(87) PCT Pub. No.: WO00/67335
PCT Pub. Date: Nov. 9, 2000

(30) Foreign Application Priority Data

Apr. 30, 1999 (JP) .............................. 11-125134
Feb. 8, 2000 (JP) ....................... 2000-030958

(51) Int. Cl.$^7$ .......................... H01M 2/12; H01M 10/52
(52) U.S. Cl. ............................ 429/56; 429/53; 429/55
(58) Field of Search ............................ 429/53–56, 57, 429/164, 176

(56) References Cited

U.S. PATENT DOCUMENTS 2,595,963 A    5/1952   Lewis et al.
3,256,117 A    6/1966   Howatt et al.
3,970,478 A *  7/1976   Jurva ........................... 429/82
5,042,675 A *  8/1991   Patterson .................... 220/89.1

FOREIGN PATENT DOCUMENTS

| DE | 624066 | 12/1935 |
| DE | 857987 | 3/1953 |
| DE | 2424428 | 12/1975 |
| DE | 4014945 | 11/1991 |
| GB | 617756 | 2/1949 |
| JP | 62-5558 | 1/1987 |
| JP | 8-31397 | 2/1996 |

* cited by examiner

*Primary Examiner*—Patrick Ryan
*Assistant Examiner*—Tracy Dove
(74) *Attorney, Agent, or Firm*—McDermott, Will & Emery

(57) ABSTRACT

The present invention provides a high-capacity cylindrical battery, wherein a burst-proof mechanism, which functions to discharge a gas outside when the internal pressure of the battery abnormally increases, does not sacrifice the space for power generating elements but increases the total capacity for power generating elements. The cylindrical battery of the present invention has a circular groove formed in the vicinity of an opening of a battery case, in which power generating elements are accommodated, the circular groove having a bottom that is bent inward the battery case and has at least one gas discharge aperture, which is sealed with a seal element. The seal element is an elastic ring to be set in the groove and seal the gas discharge aperture. This arrangement enables the gas discharge aperture to be sealed again even after the burst-proof mechanism functions, thereby ensuring a continuous use of the battery.

3 Claims, 5 Drawing Sheets

CYLINDRICAL BATTERY AND METHOD FOR MANUFACTURING THE SAME

TECHNICAL FIELD

The present invention relates to a cylindrical battery, such as an alkaline battery or a lithium battery, in which power generating elements are accommodated in a cylindrical battery case and an opening of the battery case is sealed with a sealing member, as well as to a method for manufacturing such a cylindrical battery.

BACKGROUND ART

In alkaline batteries having zinc as the anode active material, there is a fear that a gas is produced inside the battery, due to the wrong charge or the corrosion of zinc, so as to increase the internal pressure of the battery and even lead to an explosion of the battery. The alkaline batteries thus generally have a burst-proof mechanism, which functions in response to an increase in internal pressure of the battery to avoid a possible explosion.

The principle of the burst-proof mechanism is to intentionally break a specific part of lowered mechanical strength, which is a portion of a sealing member to seal the opening of the battery, on the occasion of an increase in internal pressure of the battery, so as to forcibly discharge the gas outside the battery and thereby prevent the battery from being exploded.

A typical alkaline battery having a prior art burst-proof mechanism is described with FIG. 5.

A battery case 21 keeps therein a cathode mixture 22, a separator 23, and an anode 24 as power generating elements. An upper opening of the battery case 21 has a stepped portion 25, which is bent inward by an external grooving process. A sealing member 29 of a synthetic resin, 1for example, nylon, is used to seal the opening of the battery case 21, and includes an inner tubular member 30 that supports an anode collector 28, an outer tubular member 32 that is clamped by the opening end of the battery case 21, and a joint member 31 that joins the inner tubular member 30 with the outer tubular member 32. The joint member 31 has a thin wall portion 34. A metal washer 26 having a center through hole, in which the inner tubular member 30 is fitted, and an outer circumferential portion of an anode terminal plate 33 are fitted in the outer tubular member 32 of the sealing member 29. The opening end of the battery case 21 is caulked, so that the metal washer 26 and the outer circumferential portion of the anode terminal plate 33 are securely held by the outer tubular member 32. The securely held portion is fixed on the stepped portion 25 of the battery case 21.

When the internal pressure of the battery excessively increases, the thin wall portion 34 of the sealing member 29 is broken, and the gas flowing through this broken portion is discharged outside via through holes 26a and 33a respectively formed in the metal washer 26 and the anode terminal plate 33.

As clearly understood from FIG. 5, the prior art burst-proof mechanism has a rather complicated structure and located inside the battery. The space required for the burst-proof mechanism sacrifices the capacity for the power generating elements.

Once this burst-proof mechanism functions to break the thin wall portion 34 of the sealing member 29, an electrolyte leaks through the opening of the broken portion. The open-ing is not closed and the leakage continues. After the release of the gas, even the dischargeable battery can thus not be used any longer.

In a high temperature environment of or over 60° C., the thin wall portion of the sealing member stretches not to be broken. This accordingly does not work as the burst-proof mechanism, and may lead to an explosion of the battery.

The primary object of the present invention is thus to provide a cylindrical battery having a burst-proof mechanism that does not sacrifice the space for power generating elements but increases the total capacity for power generating elements.

Another object of the present invention is also to provide a cylindrical battery that is continuously usable by shielding the inside of the battery from the outside again after the burst-proof mechanism functions to release the gas from the inside of the battery.

DISCLOSURE OF INVENTION

The primary object of the present invention is attained by a cylindrical battery that includes a battery case, in which power generating elements are accommodated, a sealing member that seals an opening of the battery case, and a circular groove that is disposed in the vicinity of the opening of the battery case and has a bottom bent inward the battery case, wherein the bottom of the groove has at least one gas discharge aperture that is sealed with a seal element.

The primary object and another object of the present invention are attained by a cylindrical battery that includes a battery case, in which power generating elements are accommodated, a sealing member that seals an opening of the battery case, and a circular groove that is disposed in the vicinity of the opening of the battery case and has a bottom bent inward the battery case, wherein the bottom of the groove has at least one gas discharge aperture that is sealed with an elastic ring set in the groove.

While the novel feature of the invention are set forth particularly in the appended claims, the invention, both as to organization and content, will be better understood and appreciated, along with other objects and features thereof, from the following detailed description taken in conjunction with the drawings.

BEST MODE FOR CARRYING OUT THE INVENTION

Figure 1:
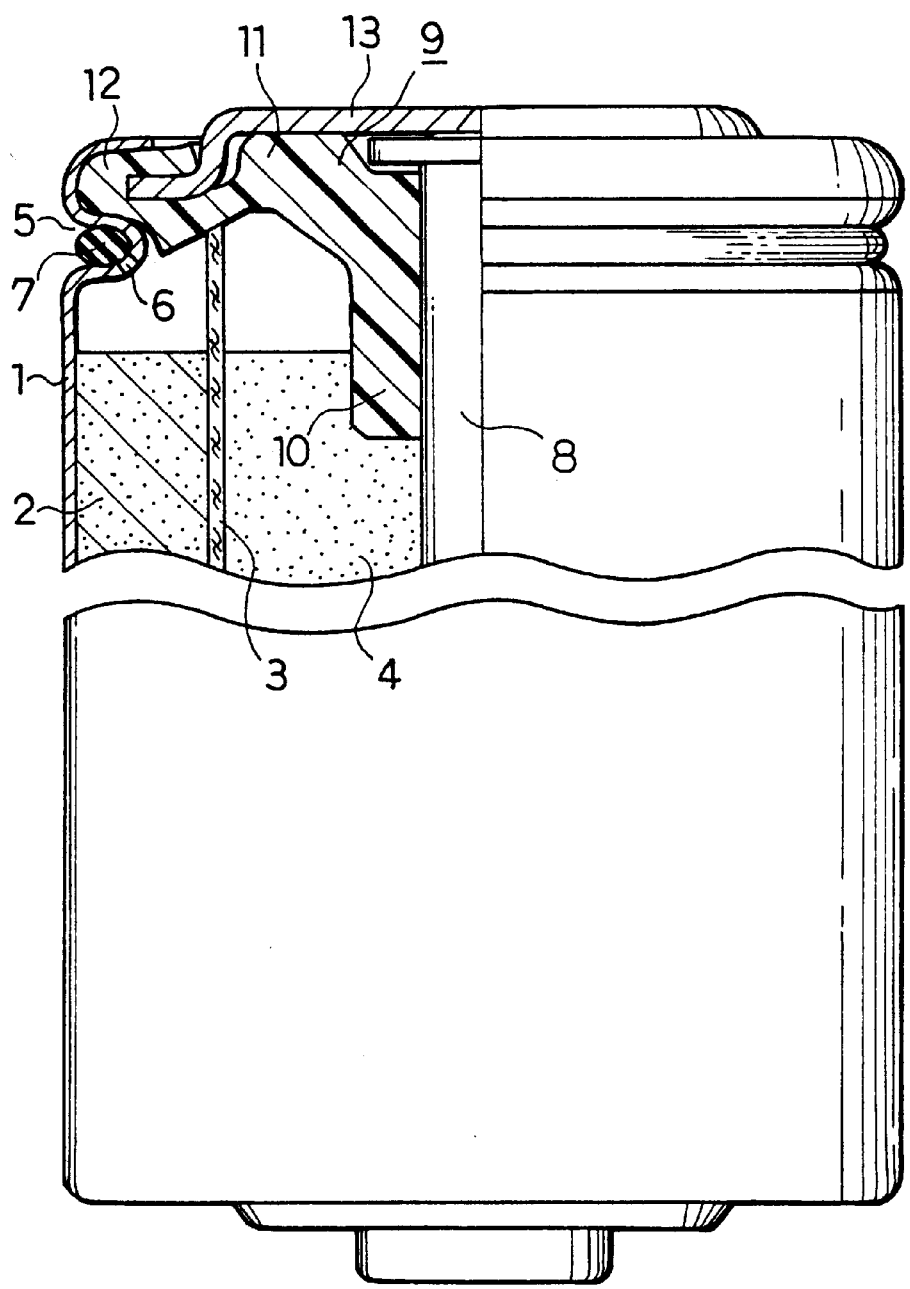
FIG. 1 is a partly omitted front view illustrating an alkaline battery in one example of the present invention.

The cylindrical battery of the present invention has a circular groove that is disposed in the vicinity of an opening of a battery case, in which power generating elements are accommodated, and has a bottom bent inward the battery case, wherein the bottom of the groove has at least one gas discharge aperture that is sealed with a seal element. When the internal pressure of the battery case increases to or over an abnormally high level, the gas presses against the seal element and flows outside through the gas discharge aperture.

In accordance with one preferable mode of the present invention, the seal element is a hot-melt adhesive. It is preferable that the seal element has a ring shape circularly extending in the groove.

In accordance with another preferable mode of the present invention, the seal element is an elastic ring set in the groove to seal the gas discharge aperture.

It is preferable that the elastic ring has a substantially circular cross section and is held inside the groove. The elastic ring is held inside the groove by pressing down and deforming the opening end of the battery case towards the bottom of the battery case to narrow the opening circumference of the groove. This arrangement enhances the effects of the elastic ring to seal the gas discharge aperture and thereby improves the leakage proof ability.

Application of a sealing agent layer on a face of the elastic ring that is in contact with the groove further improves the leakage proof ability. Application of a water repellent on a circumferential portion of the gas discharge aperture inside the battery case still further improves the leakage proof ability.

Preferable examples of the hot-melt adhesive used for the seal element are graft polymers of polyethylene or ethylene-vinyl acetate copolymer with an unsaturated acid, such as acrylic acid, methacrylic acid, or maleic acid.

Typical examples of the elastic material used for the seal element include vulcanized rubbers like silicone rubber, fluororubber, and nitrile rubber and thermoplastic elastomers like styrene-butadiene block copolymer, polyester-polyether block copolymer, and partly crosslinked blend of polypropylene and ethylene-propylene rubber.

Examples of the sealing agent include asphalt, liquid silicon rubber, and chlorosulfonated polyethylene. Examples of the water repellent include silicone grease and liquid silicone rubber.

The present invention is also directed to a method of manufacturing the cylindrical battery, which includes the step of: causing a fused hot-melt adhesive to be ejected from a nozzle of a spray in a circular groove of a battery case and solidified to close a gas discharge aperture of the circular groove. In order to form a ring-shaped seal element of the hot-melt adhesive, the hot-melt adhesive is ejected inside the groove while the battery case is rotated. In the case where a thermoplastic elastomer is used for the seal element, a mold is placed to surround the groove of the battery case and the thermoplastic elastomer is injection molded to form a seal element having a ring shape circularly extending in the groove of the battery case.

The present invention is further directed to another method of manufacturing the cylindrical battery, which includes the steps of: providing a gas discharge aperture in the vicinity of an opening of a battery case; forming a channel in a side face of the battery case to provide a circular groove having the gas discharge aperture in a bottom thereof; attaching a sealing member to the opening of the battery case and caulking an opening end of the battery case to seal the opening; setting an elastic ring in the groove to seal the gas discharge aperture; and pressing the opening end of the battery case to be deformed and thereby narrow an opening circumference of the groove.

In accordance with one preferable mode of the present invention, the method further includes the step of applying a water repellent on a circumferential portion of the gas discharge aperture inside the battery case, before the sealing member is attached to the opening of the battery case.

It is preferable that a sealing agent is applied inside the groove, before the elastic ring is set in the groove.

The following describes examples of the present invention in detail with referring to the drawings. The drawings only illustrate the schematic structures of batteries and do not accurately represent the relative sizes and positions of the respective elements.

EXAMPLE 1

This example describes a battery having a reset type burst-proof mechanism.

FIG. 1 shows the structure of an alkaline battery of this example. A battery case 1 is composed of nickel-plated steel and also functions as a cathode terminal. A cathode mixture 2 mainly including manganese dioxide and graphite, a separator 3, and a gelled anode 4 including zinc powder, an alkaline electrolyte, and a gelling agent are accommodated in the battery case 1.

A circular groove 5 having a bottom bent inward the battery case 1 is formed in the vicinity of an upper opening of the battery case 1. The bottom of the groove 5 has one or a few gas discharge apertures 6. An elastic ring 7 is set in the groove 5 to seal the gas discharge apertures 6. In the case of AAA size alkaline dry battery, it is preferable to form two through four gas discharge apertures 6 having the diameter in a range of 0.1 to 0.5 mm.

A sealing member 9 of a synthetic resin to seal the opening of the battery case 1 includes a center tubular member 10 that supports an anode collector 8 having an end inserted in the gelled anode 4, a thick wall circular member 11 that supports an anode terminal plate 13, and an L-shaped outer tubular member 12 that holds a circumferential portion of the anode terminal plate 13 when an opening end of the battery case 1 is caulked.

Figure 2:
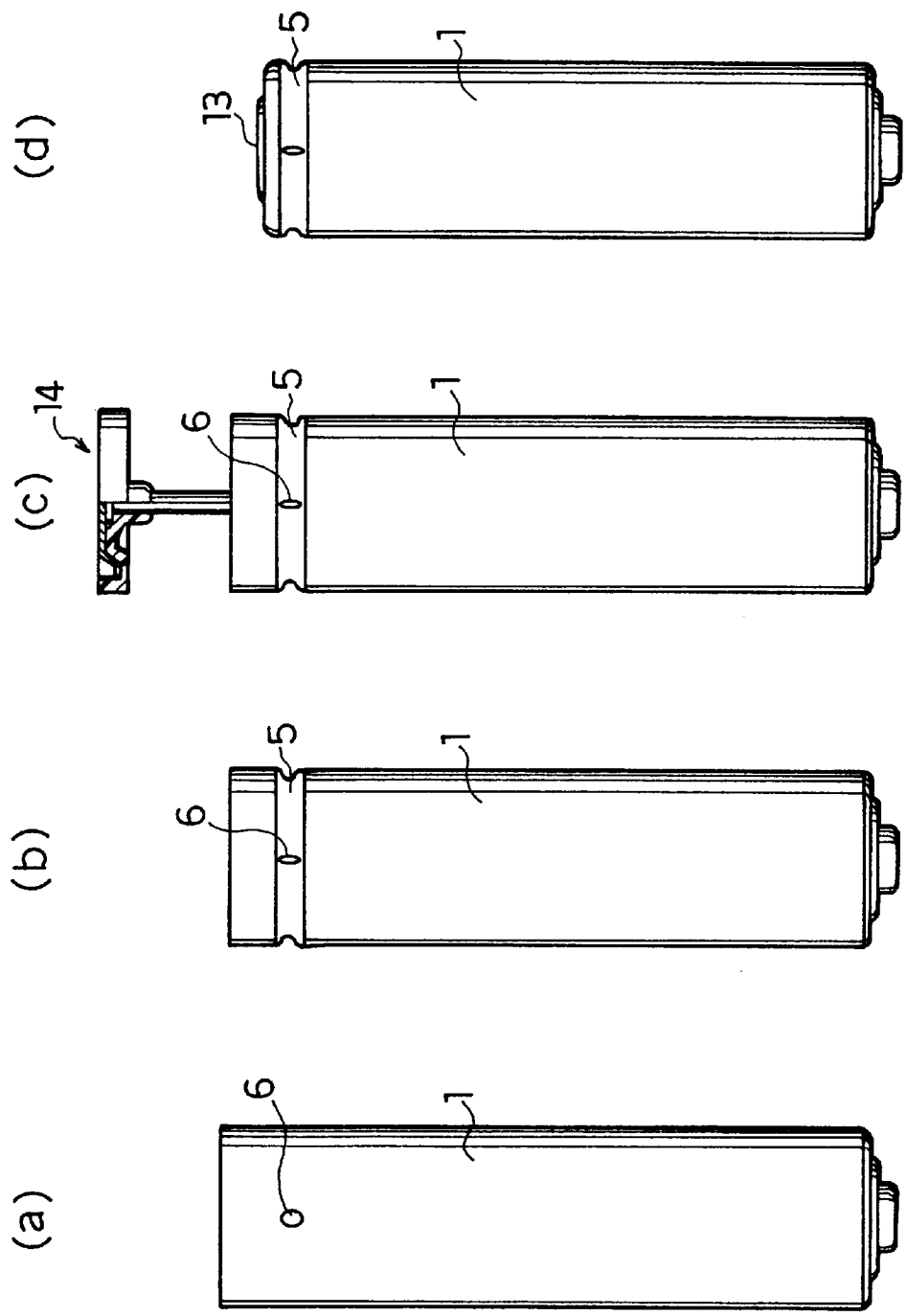
FIGS. 2A–2D show a first half of a process of manufacturing the alkaline battery of FIG. 1.
Figure 3:
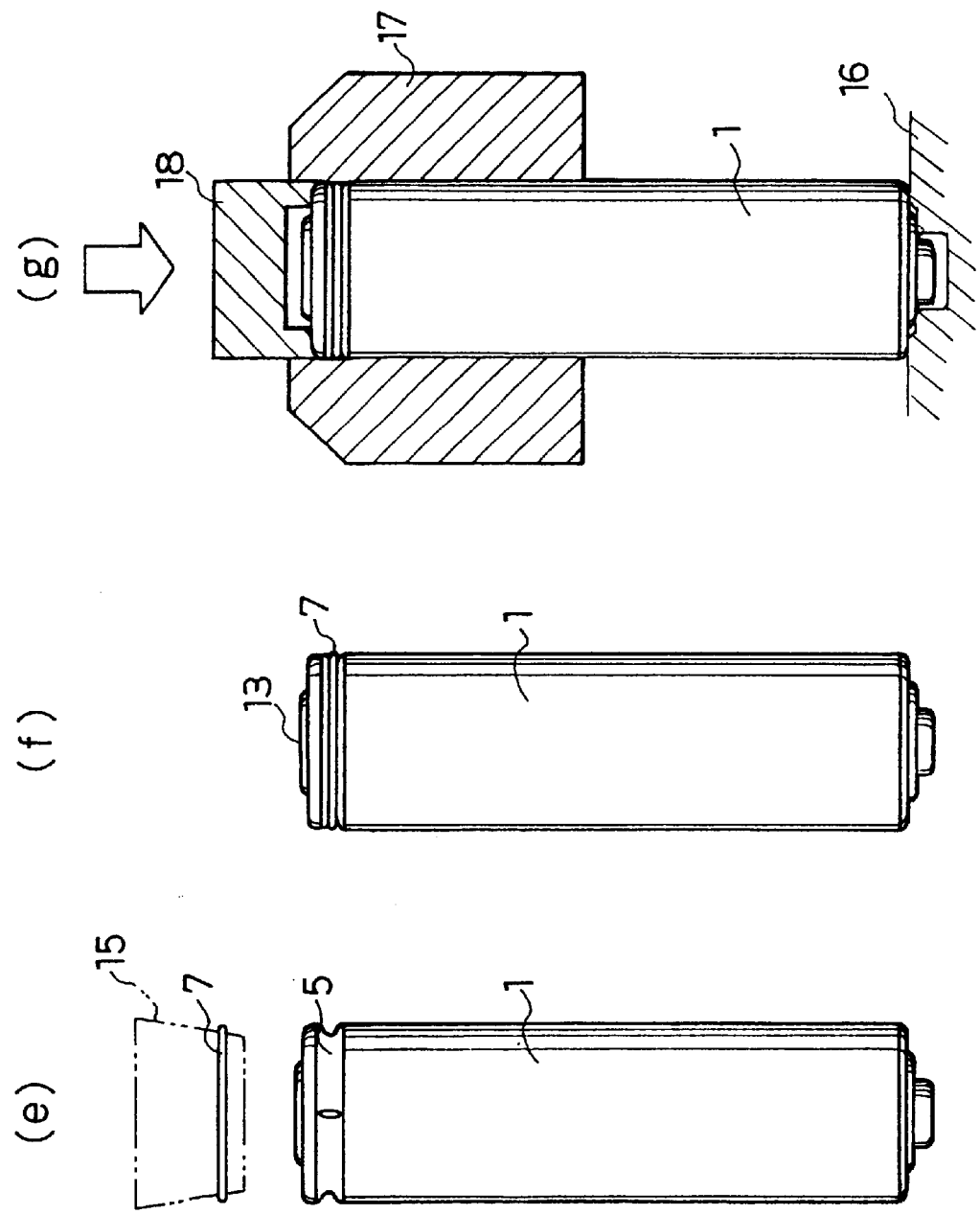
FIGS. 3e–3g show a second half of the process of manufacturing the alkaline battery of FIG. 1.

One exemplified process of manufacturing this battery is described with FIGS. 2 and 3.

Figure 4:
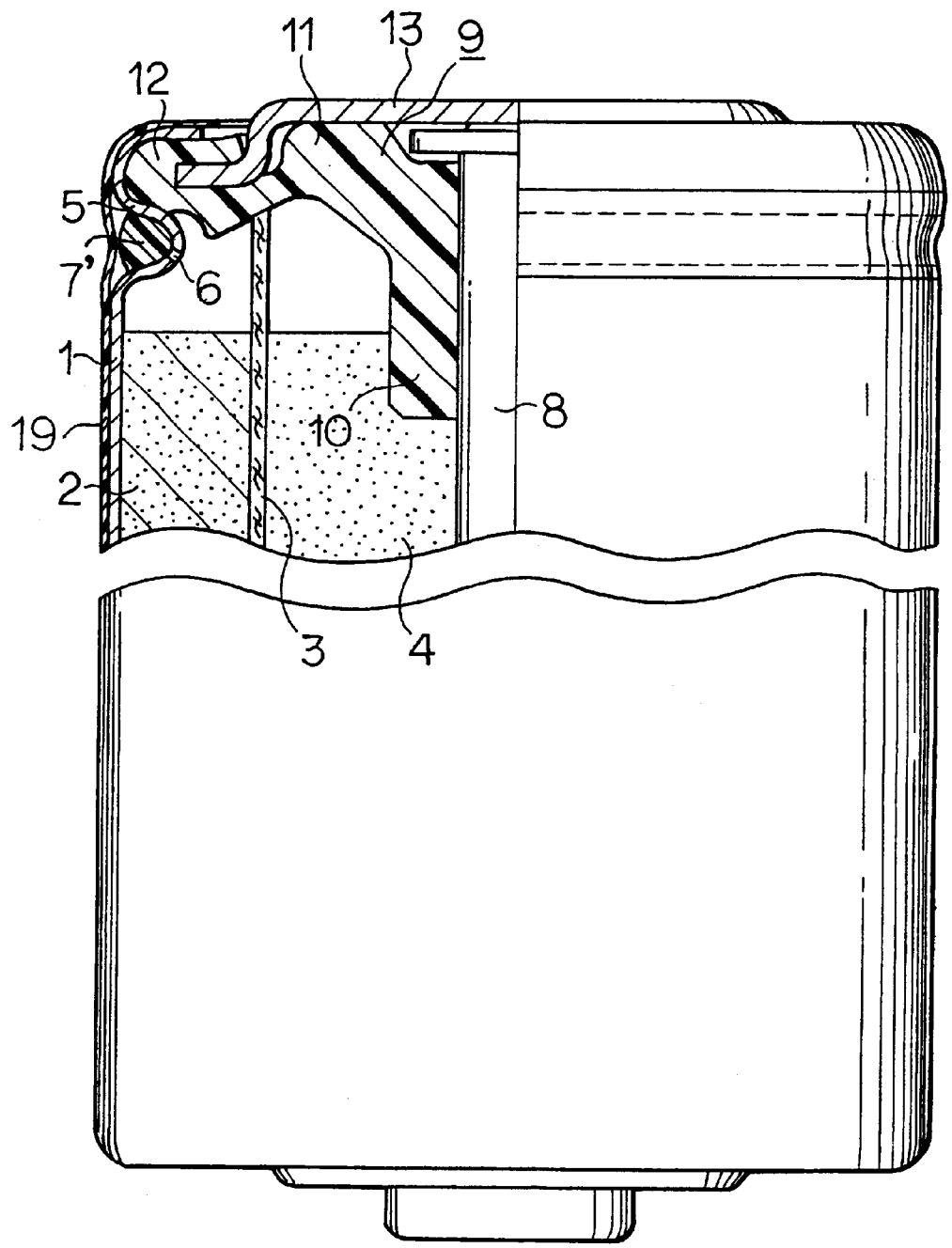
FIG. 4 is a partly omitted front view illustrating another alkaline battery in another example of the present invention.
Figure 5:
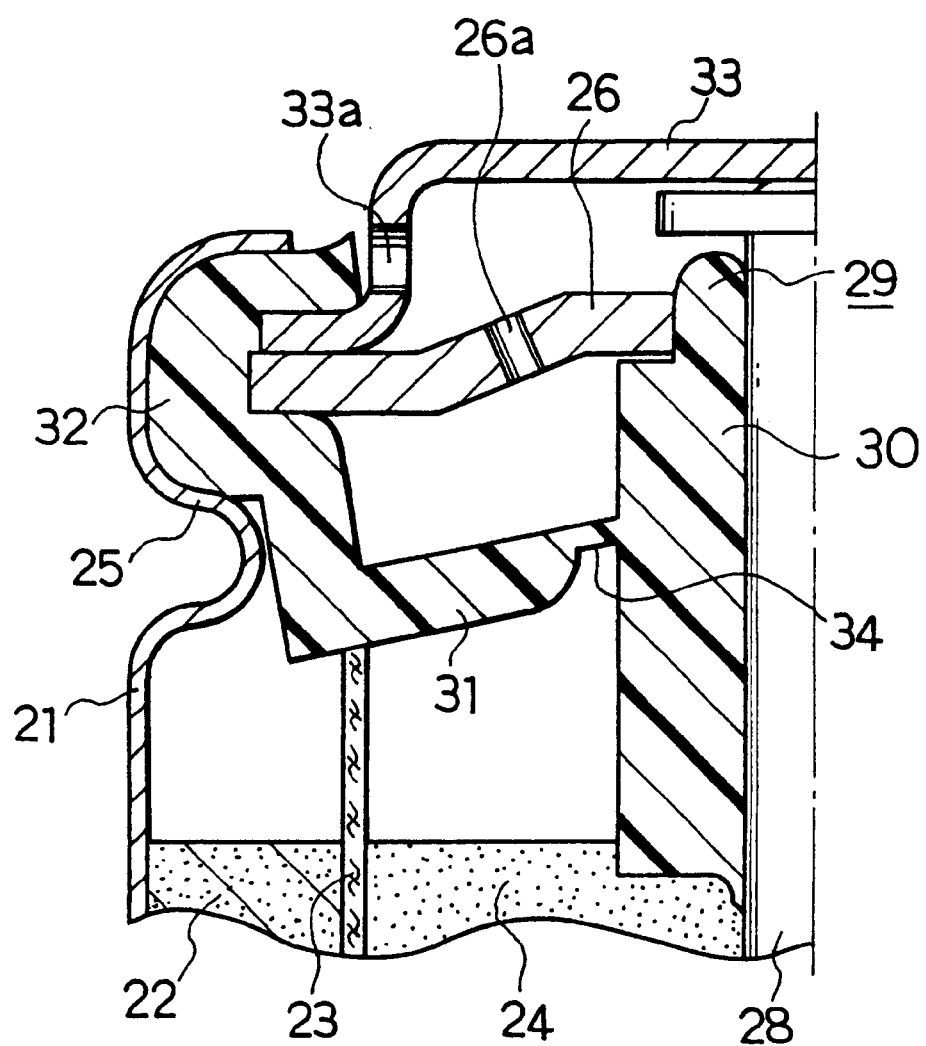
FIG. 5 is a sectional view illustrating a main part of a prior art alkaline battery.

The process first forms the gas discharge apertures 6 in the vicinity of the upper opening of the bottomed cylindrical battery case 1, which is made of a predetermined material (FIG. 2(a)). The process then inserts molded cylindrical hollow pieces of the cathode mixture into the battery case 1, presses the cylindrical hollow pieces in the battery case 1, and forms a channel in a specific portion on an outer side face of the battery case 1, which includes the gas discharge apertures (FIG. 2(b)). The process subsequently sets the separator 3 in the battery case 1 having the groove 5 formed therein to have the gas discharge apertures 6 on the bottom thereof, and injects the gelled zinc anode 4 into the recess formed inside the separator 3. At this stage, a water repellent is applied on an opening circumference of the gas discharge aperture inside the battery case 1. For convenience of the grooving process, it is preferable that the gas discharge apertures are formed to be a little shifted from the center of the groove 5 as shown in FIGS. 1 and 4.

The process then places a sealing member-collector assembly 14 with the anode collector 8 and the anode terminal plate 13 in the battery case (FIG. 2(c)). While the groove 5 is held by a chuck fitted in the groove 5 of the battery case 1, the battery case 1 is set in a predetermined caulking device. The process caulks the opening end of the battery case 1, so as to cause a specific portion of the outer tubular member 12 of the sealing member 9, which covers the circumferential part of the anode terminal plate 13, to be held between a step formed inside the battery case 1 by the groove 5 and the caulked opening end of the battery case 1 (FIG. 2(d)). At this stage, a sealing agent is applied in the groove 5. It is not necessary that the sealing agent is applied in the whole groove. Application may be restricted only to the vicinity of the gas discharge apertures.

The process then places an elastic ring on a jig 15, which arbitrarily regulates the diameter (FIG. 3(e)), and sets the elastic ring in the groove 5 of the battery case 1 (FIG. 3(f)). The process subsequently places the assembled battery in a sealing device (FIG. 3(g)). The sealing device includes a table 16, on which the battery is mounted, a die 17, in which an upper half of the battery is fitted, and a pressing member 18, which moves down in the die 17 to press the opening end of the battery case 1. While the outer face of the battery case 1 is held by the die 17, the opening end of the battery case 1 is pressed down by the pressing member 18. The opening circumference of the groove 5 of the battery case 1 is then deformed as shown in FIG. 1, so that the elastic ring 7 is compressed and held in the groove 5. The process then regulates the valve opening pressure of the valve constructed as the elastic ring to seal the gas discharge apertures, and adjusts the total height of the battery to a predetermined dimension.

The cylindrical battery of this example has a reversible safety valve constructed by setting the elastic ring in the groove, which is formed in the outer face of the battery case in the vicinity of the opening of the battery case and has the gas discharge apertures. After the safety valve functions with an increase in internal pressure of the battery to release the gas instantaneously, the gas discharge apertures are sealed-again by the elastic ring. Namely there is no leakage of the liquid via the gas discharge apertures after the function of the safety valve. The safety valve is formed on the outer face of the battery, thereby reducing the required space in the sealed opening of the battery and enabling the battery to have a high capacity, compared with the prior art burst-proof mechanism. For example, application of the arrangement of the present invention to an AAA size alkaline dry battery improves the capacity by approximately 5%.

EXAMPLE 2

This example describes a battery with a non-reset type burst-proof mechanism.

FIG. 4 shows the structure of an alkaline battery of this example. In this figure, the same numerals as in FIG. 1 denote the same elements as in FIG. 1. In the structure of this example, one gas discharge aperture 6 is formed in the bottom of the groove 5 and sealed by a seal element 7' composed of a hot-melt adhesive. A jacket label 19 is composed of a heat-shrinkable resin and has a print of a trade mark, a grade of the battery, or the like.

In this example, the seal element 7' has a ring shape. The ring-shaped seal element 7' is provided, for example, by ejecting a fused hot-melt adhesive into the groove 5 from an ejector while the battery case 1 is rotated in the step of FIG. 3(e).

The seal element 7' may not have a ring shape but be simply stuck to the circumferential part of the gas discharge aperture 6, so as to seal the gas discharge aperture. In this case, since there is a fear that the seal element is peeled off, it is preferable to ensure a sufficient area of adhesion to the battery case 1. When the seal element 7' is stuck to the groove 5 to cover only the vicinity of the gas discharge aperture 6, there is a clearance between the bottom of the groove 5 and the jacket label 19 in a specific part without the seal element 7'. When an external force is applied to the specific part of the jacket label, for example, by an end of a spring constructed as a terminal of an apparatus driven with the power of the battery, the jacket label may be torn or wrinkled. The ring-shaped seal element does not cause any such problems.

The above embodiments regard the alkaline batteries, but the principle of the present invention is also applicable to other cylindrical batteries, for example, lithium batteries. Especially advantageous is application of the present invention to the structure having a stepped portion defined by a groove, which is formed in the vicinity of the opening of the battery case, to support the sealing member. The principle of the present invention is preferably applied to the lithium battery, in which the internal pressure may increase abnormally by an abrupt discharge or chemical reactions under application of abnormal current loading or abnormal heating.

INDUSTRIAL APPLICABILITY

As described above, the present invention provides a cylindrical battery having a burst-proof mechanism that does not sacrifice the space for power generating elements but increases the total capacity for power generating elements.

Application of an elastic ring for the seal element gives the cylindrical battery that effectively prevents leakage of the electrolyte even after the function of the burst-proof mechanism.

What is claimed is:

1. A cylindrical battery comprising: a battery case in which power generating elements are accommodated; a sealing member that seals an opening of said battery case; a circular groove that is disposed in the vicinity of the opening of said battery case and has a bottom protruding towards the inside of said battery case; at least one gas discharge aperture provided at the bottom of said groove; and an elastic ring that seals said gas discharge aperture, wherein said elastic ring is held inside said groove in such a manner as to be compressed by a narrowed opening circumference of said groove.

2. A cylindrical battery in accordance with claim 1, wherein a layer of a sealing agent is applied on a face of said elastic ring that is in contact with said groove.

3. A cylindrical battery in accordance with claim 1, wherein a water repellent is applied on a circumferential part of the gas discharge aperture inside said battery case.

* * * * *